United States Patent [19]

Rossigno

[11] Patent Number: 4,820,076
[45] Date of Patent: Apr. 11, 1989

[54] STAKED STUD TORQUE RETENTION RIBS
[75] Inventor: Louis P. Rossigno, Granger, Ind.
[73] Assignee: Allied-Signal Inc., Morristown, N.J.
[21] Appl. No.: 934,974
[22] Filed: Nov. 25, 1986

Related U.S. Application Data

[63] Continuation-in-part of Ser. No. 669,674, Nov. 8, 1984, abandoned.

[51] Int. Cl.$^4$ .......................... F16D 1/12; B23P 11/02
[52] U.S. Cl. .............................. 403/284; 403/406.1;
29/509; 29/522.1; 411/179; 411/189
[58] Field of Search ............... 411/187, 188, 189, 103,
411/105, 109, 107, 181, 180, 179; 403/274,
406.1, 284; 29/522 R, 522 A, 509

[56] References Cited

U.S. PATENT DOCUMENTS

| | | | |
|---|---|---|---|
| 521,825 | 6/1894 | Shipe | 411/181 |
| 2,053,478 | 9/1936 | Horton | 403/274 |
| 2,129,583 | 9/1938 | Johansson | 411/542 |
| 2,584,696 | 2/1952 | Graham | 403/284 |
| 3,116,816 | 6/1964 | Johnson | 411/109 X |
| 3,213,914 | 10/1965 | Baumle et al. | 411/179 |
| 3,253,631 | 5/1966 | Reusser | 411/179 |
| 3,403,717 | 10/1968 | Lemelson | 411/189 X |
| 3,785,420 | 6/1974 | Bradley et al. | 411/188 |
| 4,025,208 | 5/1977 | Donahue | 403/284 X |
| 4,057,885 | 11/1977 | Giger et al. | 29/509 |
| 4,087,897 | 5/1978 | Scholefield | 29/509 |
| 4,114,670 | 9/1978 | Akashi et al. | 29/522 R |
| 4,188,800 | 2/1980 | Fujita et al. | 403/284 X |
| 4,253,226 | 3/1981 | Takeda | 29/522 R X |
| 4,357,746 | 11/1982 | Kytta | 411/176 |

Primary Examiner—Andrew V. Kundrat
Assistant Examiner—Peter M. Cuomo
Attorney, Agent, or Firm—Leo H. McCormick, Jr.; Ken C. Decker

[57] ABSTRACT

A stud (24) and shell (10) arrangement wherein the shell (10) has openings (16 and 18) with a reinforcing ring (22) that is offset from a planar surface (20) and the stud (24) has a head (36) with a groove (38) located between the shank (30) and an arcuate section (40) adjacent its periphery (42). The ring (22) is located in the groove (38) and a cylindrical section (34) adjacent the head (36) is sheared to define a flange (35) that engages the ring (22) causing a portion thereof to flow around ribs (44), in the groove (38) and seal openings (16 and 18). Each of the ribs (44) has a first surface (52) which extends in a plane perpendicular to groove (38) and a second surface (56) which slope from an apex (54) toward the groove (38). The material from flange (35) engages the first surface (52) to resist torque that may be applied to both attach and remove a nut therefrom. The arcuate section (40) has sufficient area to uniformly distribute lateral forces that may be applied to the shaft (26) without effecting the seal.

2 Claims, 1 Drawing Sheet

STAKED STUD TORQUE RETENTION RIBS

This application is a Continuation In Part of U.S. Application Ser. No. 669,674, filed Nov. 8, 1984, now abandoned.

This invention relates to the attachment of a stud to a shell. The stud later being attached to a stationary member for locating the shell within an operating environment.

A reduction in the guage of the stud from which the shell of a vacuum brake booster has resulted in a lighter weight unit that possesses adequate strength for withstanding reaction forces produced during a brake application. Unfortunately when mounting studs for attaching the shell to a stationary member are welded to such light guage steel shells, a molecular structure change can occur such that after a period of dynamic loading, as can occur during a brake application, it is possible to produce stress cracks in the welded area.

U.S. Pat. No. 4,409,460 discloses a brake booster wherein a thin shell material which has been reinforced by a plate to which a stud member has been welded. This welding process is carried out over a reduced area to reduce the energy required to join the parts together. While this type of welding does reduce the formation of stress area, the introduction of heat to the steel shell still changes the molecular structure around the opening and the possibility of stress cracks still remains.

The stud of the present invention has a head attached to a shank. The head has a groove located between the shank and a flat arcuate section located adjacent its periphery. A series of radial ribs located in the groove extending from the shank to the arcuate section. Each rib has a first surface that extends in a plane perpendicular to the groove to an apex that has a height that is about one half of the depth of the groove and a second surface that extends from the apex along a slope to the groove. At one point in the groove, the first and second ribs have adjacent first surfaces and at a point substantially 180° therefrom, the second surfaces are adjacent to each other. An opening in the shell of the brake booster has a ring that is offset from a substantially flat end member. The ring engages the apex of the ribs. A force is applied to a cylindrical section of the shank causing a portion thereof to be sheared therefrom. The sheared portion engages the shell and flows into the offset area of the shell. As the force is applied a portion of the ring flows into the grooves to surround the ribs. The force is applied until the sheared portion is in substantially the same plane as the end member, and a fluid seal is established for the opening. In addition, the material from the ring surrounds the ribs to hold the stud from turning in the opening when a torque is applied thereto.

An advantageous effect of this invention occurs since the arcuate section that engages the end member provides a sufficient base to absorb any lateral force that the stud may encounter without destroying the fluid seal of the opening.

Another advantage of this invention resides in the selected height of the ribs that are located in the groove and the offset of the ring are matched such that when the sheared material is in the same plane as the end member about half of the gauge thickness for the shell remains.

It is an object of this invention to provide a vacuum brake booster shell with a stud having a head member that has sufficient area to withstand lateral forces while at the same time preventing the stud from rotating when subjected to a rotational torque.

These advantages and objects should be apparent from reading this specification while viewing the drawings.

The invention will now be described with reference to the accompanying drawings wherein.

Figure 1:
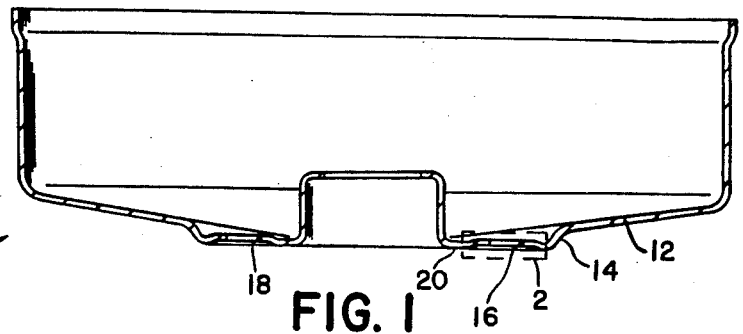
FIG. 1 is a sectional view of a shell for a vacuum brake booster.
Figure 2:
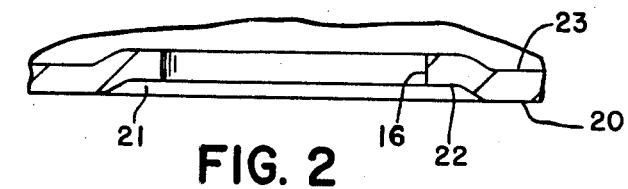
FIG. 2 is an enlarged view of circumscribed section 2 in FIG. 1 showing an opening in the shell.

The shell 10 shown in FIG. 1 is a thin shell stamped steel member which has an end member 12. End member 12 has a series of ribs or pleats 14 located therein which acts as stiffening members. A series of openings 16 and 18 are located in the same plane 20 on the end member 12. As best shown in FIG. 2 for opening 16 a reinforcing ring 22 is offset from plane 20 of the end member 12. The offset is selected such that it is less than the gauge thickness of the material of the end member 12.

While the openings 16 and 18 are illustrated for shell 10, under some circumstances more openings may be required to position the shell to a stationary member.

Figure 3:
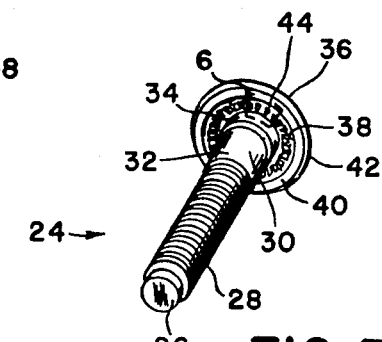
FIG. 3 is a perspective view of a stud made according to the principals of this invention.
Figure 7:
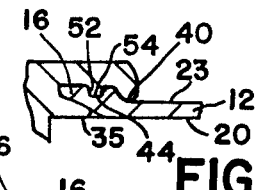
FIG. 7 is an enlarged sectional view of the circumscribed section 7 in FIG. 6 showing the engagement of a rib with the shell.

The stud 24 shown in FIG. 3 has a shaft 26 with threads 28 thereon that extend to a shank 30. Shank 30 has a first diameter section 32 and a second diameter section 34. A head member 36 attached to the second diameter 34 of the shank 30 has an interior face with a groove 38 located between the second diameter 34 and an arcuate surface 40 located adjacent the peripheral surface 42. A series of ribs 44 extend from the second diameter 34 on shank 30 toward the arcuate surface 40. The height of the ribs 44 is selected to be approximately equal to the offset selected for the reinforcing ring 22 in shell 10.

Figure 6:
FIG. 6 is an enlarged perspective view of a segment of the ribs located in a groove in the head of the stud.

As best seen in FIG. 6, each rib 44 has a first surface 52 that extends in a perpendicular plane from the groove 38 to the apex 54 and a second surface 56 that slopes from the apex 54 to the groove 38.

Figure 4:
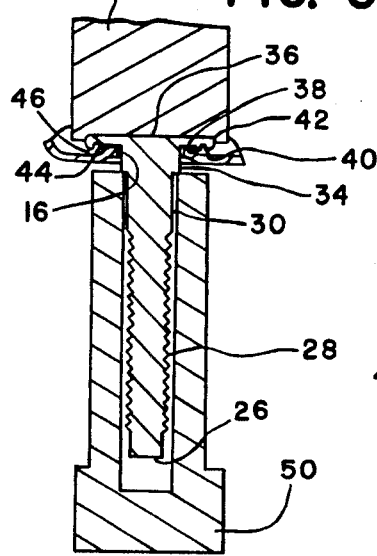
FIG. 4 is an enlarged section showing the stud of FIG. 3 located in the opening of FIG. 2.

Stud 24 is positioned in opening 16 (or any other opening) of shell 10. As best seen in FIG. 4, there is a gap 46 located between annular surface 40 and the end member 12 since the reinforcing ring 22 is located in groove 38 and held away from the bottom of the groove by ribs 44.

A backing fixture 48 is positioned adjacent head 36 and a staking or shearing fixture 50 is positioned over shaft 26. A series of blows are applied by the shearing fixture to the second diameter 34 causing a portion thereof to be sheared therefrom and define a third diameter 35. The sheared material flows into the offset area 21 of end member 12. The shearing blows continue until such time as the material sheared from the second diameter completely fills offset area 21 or is in the same plane 20 as end member 12. When the sheared material fills the offset area 21, a fluid seal is established for opening 16. In addition, material from the reinforcing ring 22 flow into groove 38 to surround serrations or ribs 44. The material from the reinforcing ring 22 engages the first surfaces 52 on the ribs 44 and in the space 45 forms a mechanical barrier that provides resistance to any torque that may be applied to shaft 26 as nuts are attached or removed thereto to fix the shell 10 to a stationary member.

Figure 5:
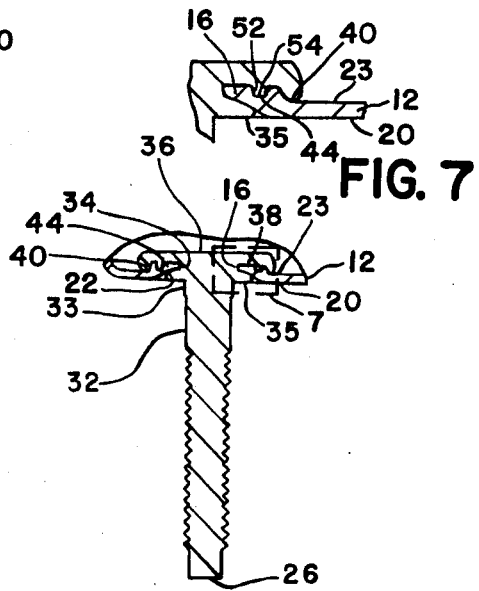
FIG. 5 is an enlarged section showing the attachment of the stud of FIG. 3 with the shell of FIG. 2.

From space 45 as shown in FIG. 6, the slope of the second surface 56 on first half of the ribs 44 is in one direction while the slope of the other second half ribs 44 is in the other or opposite direction. The material from reinforcing ring 20 flows to the bottom of groove 38 and in essence forms a minor image of the ribs. The material 35, as best shown in FIG. 5, holds the head 36 against the end member 12. Since the first surface 52 directly engages the flowed material from reinforcing ring 22, equal torque force would be required to shear the ribs 44 in either the attachment or removal of a nut from threads 28.

Thus with this attachment for the stud 24 to shell 10, sufficient torque resistance is achieved without the ribs 44 weakening the reinforcing ring 22 while at the same time the arcuate surface 40 on head 36 provides a broad base for resisting any lateral forces that may be applied to shaft 26 which could break the fluid seal for opening 16.

I claim:

1. In a brake booster having a shell made of a thin gauge metal, a plurality of fastener members for attaching an end member of the shell to another member whereby a seal is maintained even though the fastener members may be subjected to lateral forces, each of said fastener members comprising:

a reinforcing ring surrounding an opening located in said end member of the shell, said end member having an inner surface and an outer surface, said reinforcing ring being offset from said outer surface a distance less than a thickness of the thin gauge metal in said end member; and a stud member located in said opening, said stud member having a head attached to a shaft, said head having a groove located between an arcuate surface adjacent its periphery and said shaft, said head having a series of radial ribs located in said groove, said ribs having a first series of surfaces and second series of surfaces, said first and second series of surfaces extending in a plane that is perpendicular to said groove, said radial ribs having a height of about one half the depth of said groove, said shaft having a cylindrical surface adjacent said head that is deformed to define an annular projection that engages said outer surface to bring said arcuate surface into engagement with said inner surface, said inner surface flowing into said groove and into engagement with said first and second series of surfaces on said ribs until said annular projection is in a plane substantially the same as said inner surface of said end member, said arcuate surface on engagement with said inner surface limiting an engagement of said reinforcing ring with said ribs to prevent the ribs from completely piercing the thin gauge metal of said reinforcing ring, said another member engaging said end member when a nut is attached to said shaft, said first series of surfaces engaging said inner surface to prevent rotative torque applied to the nut from rotating said shaft said reinforcing ring and arcuate surface uniformly distributing any lateral forces applied to said shaft into said end member and thereby prevent stress failures in the end member which would effect the seal between the arcuate surface and inner surface such that a leak path could occur from the inner surface to the outer surface of the end member.

2. In the brake booster as recited in claim 1 wherein said first series of surfaces are opposite to said second series of surfaces such that the rotative torque resistance for attaching and removing the nut from shaft is substantially identical.

* * * * *